US009389998B2

United States Patent
Lee (10) Patent No.: US 9,389,998 B2
(45) Date of Patent: Jul. 12, 2016

(54) MEMORY FORMATTING METHOD, MEMORY CONTROLLER, AND MEMORY STORAGE APPARATUS

(75) Inventor: Chien-Fu Lee, Yunlin County, TX (US)

(73) Assignee: PHISON ELECTRONICS CORP., Miaoli (TW)

( * ) Notice: Subject to any disclaimer, the term of this patent is extended or adjusted under 35 U.S.C. 154(b) by 560 days.

(21) Appl. No.: 13/545,987

(22) Filed: Jul. 11, 2012

(65) Prior Publication Data

US 2013/0290609 A1    Oct. 31, 2013

(30) Foreign Application Priority Data

Apr. 25, 2012  (TW) .............................. 101114784 A (51) Int. Cl.
| | |
|---|---|
| G06F 12/00 | (2006.01) |
| G06F 12/02 | (2006.01) |
| G06F 17/30 | (2006.01) |
| G06F 3/06 | (2006.01) |

(52) U.S. Cl.
 CPC ...... *G06F 12/0246* (2013.01); *G06F 17/30138* (2013.01); *G06F 3/0638* (2013.01); *G06F 2212/7201* (2013.01); *Y02B 60/1225* (2013.01)

(58) Field of Classification Search
 CPC .................................................. G06F 12/0246
 See application file for complete search history.

(56) References Cited

U.S. PATENT DOCUMENTS

| | | | | |
|---|---|---|---|---|
| 8,312,554 B2* | 11/2012 | Wang et al. | ..................... | 726/26 |
| 2005/0080985 A1* | 4/2005 | Sasaki | ............................ | 711/103 |
| 2010/0115004 A1* | 5/2010 | Liao | .............................. | 707/822 |
| 2010/0153660 A1* | 6/2010 | Lasser | ................. | G06F 12/0246 |
| | | | | 711/154 |
| 2010/0318720 A1* | 12/2010 | Rajagopalan et al. | ........ | 711/103 |
| 2011/0099324 A1* | 4/2011 | Yeh | ................................. | 711/103 |
| 2011/0119455 A1* | 5/2011 | Tsai et al. | ..................... | 711/154 |

\* cited by examiner

*Primary Examiner* — Adam M Queler
*Assistant Examiner* — Trang Ta
(74) *Attorney, Agent, or Firm* — Jianq Chyun IP Office (57) ABSTRACT

A memory formatting method adapted to a memory storage apparatus is provided. The memory formatting method includes configuring a plurality of logical block addresses to be mapped to a portion of a plurality of physical blocks, generating a first file system data and a second file system data according to the size of the logical block addresses, and storing the first file system data into a first physical block, and the first physical block is mapped to a first logical block address among the logical block addresses. The memory formatting method also includes selecting a second physical block among the physical blocks, storing the second file system data into the second physical block, determining whether a format command is received, and when the format command is received, re-mapping the first logical block address to the second physical block.

21 Claims, 11 Drawing Sheets

FIG. 9B

MEMORY FORMATTING METHOD, MEMORY CONTROLLER, AND MEMORY STORAGE APPARATUS

CROSS-REFERENCE TO RELATED APPLICATION

This application claims the priority benefit of Taiwan application serial no. 101114784, filed on Apr. 25, 2012. The entirety of the above-mentioned patent application is hereby incorporated by reference herein and made a part of this specification.

BACKGROUND

1. Technology Field

The present invention relates to a method for formatting a memory and a memory controller and a memory storage apparatus using the same.

2. Description of Related Art

Along with the widespread of digital cameras, cell phones, and MP3 players in recently years, the consumers' demand to storage media has increased drastically. Rewritable non-volatile memory (for example, flash memory) is very suitable for aforementioned portable electronic apparatuses due to its many characteristics such as data non-volatility, low power consumption, small volume, and non-mechanical structure.

Generally, a rewritable non-volatile memory storage apparatus has to be formatted before being used for storing data. Or, a user usually formats a rewritable non-volatile memory storage apparatus when the user wants to permanently delete all data stored in the rewritable non-volatile memory storage apparatus. However, along with the increase in the capacity of rewritable non-volatile memory storage apparatus, the time required for formatting a rewritable non-volatile memory storage apparatus also increases considerably. Thereby, a mechanism for quickly formatting a rewritable non-volatile memory storage apparatus needs to be developed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a memory formatting method, a memory controller, and a memory storage apparatus, in which the time for executing a format command is effectively shortened.

According to an exemplary embodiment of the present invention, a memory formatting method for a memory storage apparatus is provided. The memory storage apparatus has a rewritable non-volatile memory module, and the rewritable non-volatile memory module has a plurality of physical blocks. The memory formatting method includes configuring a plurality of logical block addresses for mapping to a portion of the physical blocks. The memory formatting method also includes generating a first file system data and a second file system data according to the size of the logical block addresses and storing the first file system data into at least one first physical block among the physical blocks, wherein the at least one first physical block is mapped to at least one first logical block address among the logical block addresses. The memory formatting method further includes selecting at least one second physical block among the physical blocks and storing the second file system data into the at least one second physical block. The memory formatting method still includes determining whether a format command is received from a host system and re-mapping the at least one first logical block address to the at least one second physical block when the format command is received from the host system.

According to an exemplary embodiment of the present invention, a memory controller for controlling a rewritable non-volatile memory module of a memory storage apparatus is provided. The rewritable non-volatile memory module has a plurality of physical blocks. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit configures a plurality of logical block addresses to be mapped to a portion of the physical blocks. The memory management circuit also generates a first file system data and a second file system data according to the size of the logical block addresses and stores the first file system data into at least one first physical block among the physical blocks, wherein the at least one first physical block is mapped to at least one first logical block address among the logical block addresses. The memory management circuit further selects at least one second physical block among the physical blocks and stores the second file system data into the at least one second physical block. The memory management circuit still determines whether a format command is received from the host system, and when the format command is received from the host system, the memory management circuit re-maps the at least one first logical block address to the at least one second physical block.

According to an exemplary embodiment of the present invention, a memory storage apparatus including a connector, a rewritable non-volatile memory module, and a memory controller is provided. The connector is configured to couple to a host system. The rewritable non-volatile memory module has a plurality of physical blocks. The memory controller is coupled to the connector and the rewritable non-volatile memory module. The memory controller configures a plurality of logical block addresses to be mapped to a portion of the physical blocks. The memory controller also generates a first file system data and a second file system data according to the size of the logical block addresses and stores the first file system data into at least one first physical block among the physical blocks, wherein the at least one first physical block is mapped to at least one first logical block address among the logical block addresses. The memory controller further selects at least one second physical block among the physical blocks and stores the second file system data into the at least one second physical block. The memory controller still determines whether a format command is received from the host system, and when the format command is received from the host system, the memory controller re-maps the at least one first logical block address to the at least one second physical block.

As described above, the memory formatting method, the memory controller, and the memory storage apparatus in the exemplary embodiments can quickly execute a formatting procedure so that the waiting time of a user can be effectively shortened.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1A:
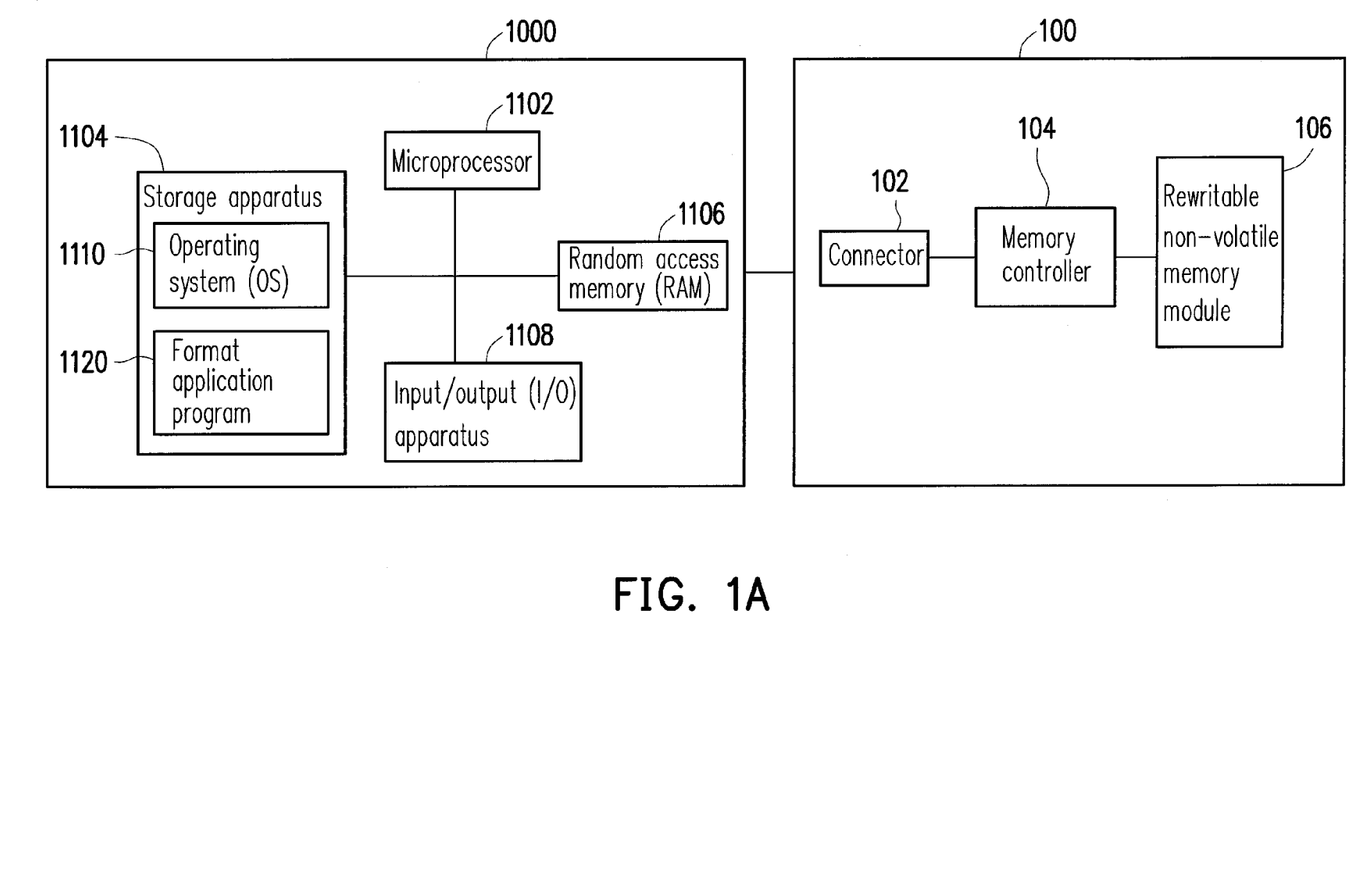
FIG. 1A is a schematic block diagram of a host system and a memory storage apparatus according to an exemplary embodiment.

FIG. 1A is a schematic block diagram of a host system and a memory storage apparatus according to an exemplary embodiment.

Referring to FIG. 1A, the host system 1000 includes a microprocessor 1102, a storage apparatus 1104, a random access memory (RAM) 1106, and an input/output (I/O) apparatus 1108. When the host system 1000 is boot up, the microprocessor 1102 executes an operating system (OS) 1110 installed in the storage apparatus 1104 so that the host system 1000 can provide corresponding functions according to a user's operations. For example, in the present exemplary embodiment, the host system 1000 is a computer system, the OS 1110 is a Windows OS, and after the host system 1000 is boot up, the user can operate the host system 1000 through the I/O apparatus 1108, so as to perform various functions, such as editing text files, editing audio/video files, and playing audio/video.

Figure 1B:
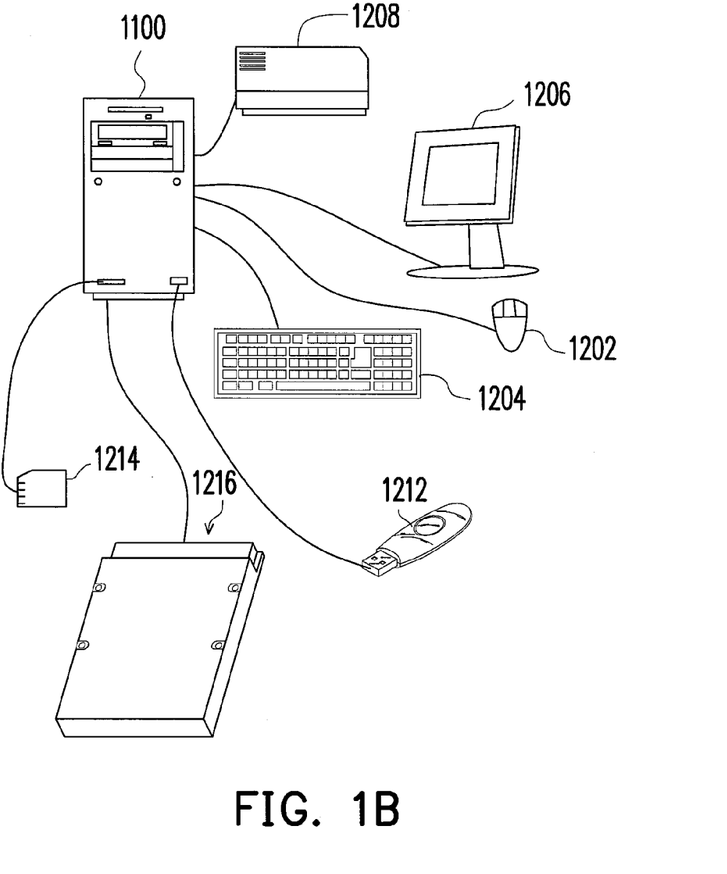
FIG. 1B is a diagram of a computer, an input/output (I/O) device, and a memory storage apparatus according to an exemplary embodiment of the invention.

A memory storage apparatus 100 is coupled to the host system 1000 and executes data reading and writing operations according to commands issued by the OS 1110 of the host system 1000. The memory storage apparatus 100 is a rewritable non-volatile memory storage apparatus, such as the flash drive 1212, the memory card 1214, or the solid state drive (SSD) 1216 illustrated in FIG. 1B.

Figure 1C:
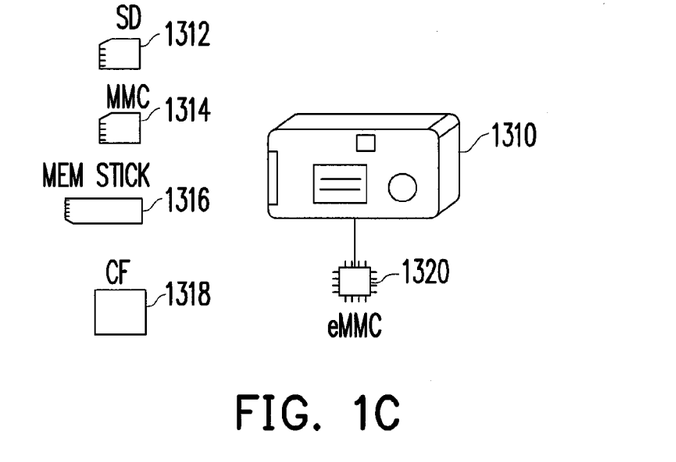
FIG. 1C is a diagram of a host system and a memory storage apparatus according to another exemplary embodiment of the present invention

Even though the host system 1000 is described as a computer system in the present exemplary embodiment, in another exemplary embodiment of the invention, the host system 1000 may also be a digital camera, a video camera, a communication apparatus, an audio player, or a video player. For example, if the host system is a digital camera (video camera) 1310, the rewritable non-volatile memory storage apparatus is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

The memory storage apparatus 100 includes a connector 102, a memory controller 104, and a rewritable non-volatile memory module 106.

The connector 102 complies with the universal serial bus (USB) standard. However, the invention is not limited thereto, and the connector 102 may also comply with the MS standard, the MMC standard, the CF standard, the Institute of Electrical and Electronic Engineers (IEEE) 1394 standard, the peripheral component interconnect (PCI) express standard, the serial advanced technology attachment (SATA) standard, the parallel advanced technology attachment (PATA) standard, the SD standard, the integrated device electronics (IDE) standard, or any other suitable standard.

The memory controller 104 executes a plurality of logic gates or control instructions implemented in a hardware form or a firmware form and performs various data operations on the rewritable non-volatile memory module 106 according to commands issued by the host system 1000. In particular, the memory controller 104 can execute a format command issued by the host system 1000 according to the memory formatting method in the present exemplary embodiment. To be specific, when a user executes a format application program 1120 in the host system 1000 and operates the format application program 1120 to execute a format command on the memory storage apparatus 100, the memory controller 104 responds to the format command according to the memory formatting method in the present exemplary embodiment. For example, the format application program 1120 transmits the format command to the memory controller 104 through a vendor command. Then, the memory formatting method in the present exemplary embodiment will be described in detail with reference to accompanying drawings.

The rewritable non-volatile memory module 106 is coupled to the memory controller 104 and configured to store data written by the host system 1000. The rewritable non-volatile memory module 106 includes a plurality of physical blocks. Each of the physical blocks has a plurality of physical pages, wherein the physical pages belonging to the same physical block can be individually written but have to be erased all together. To be specific, physical block is the smallest unit for erasing data. Namely, each physical block contains the least number of memory cells that are erased all together. Physical page is the smallest unit for programming data. Namely, physical page is the smallest unit for writing data. However, in another exemplary embodiment of the present invention, the smallest unit for writing data may also be sector or another unit. In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, a trinary level cell (TLC) NAND flash memory module, any other flash memory module, or any other memory module having the same characteristics.

Figure 2:
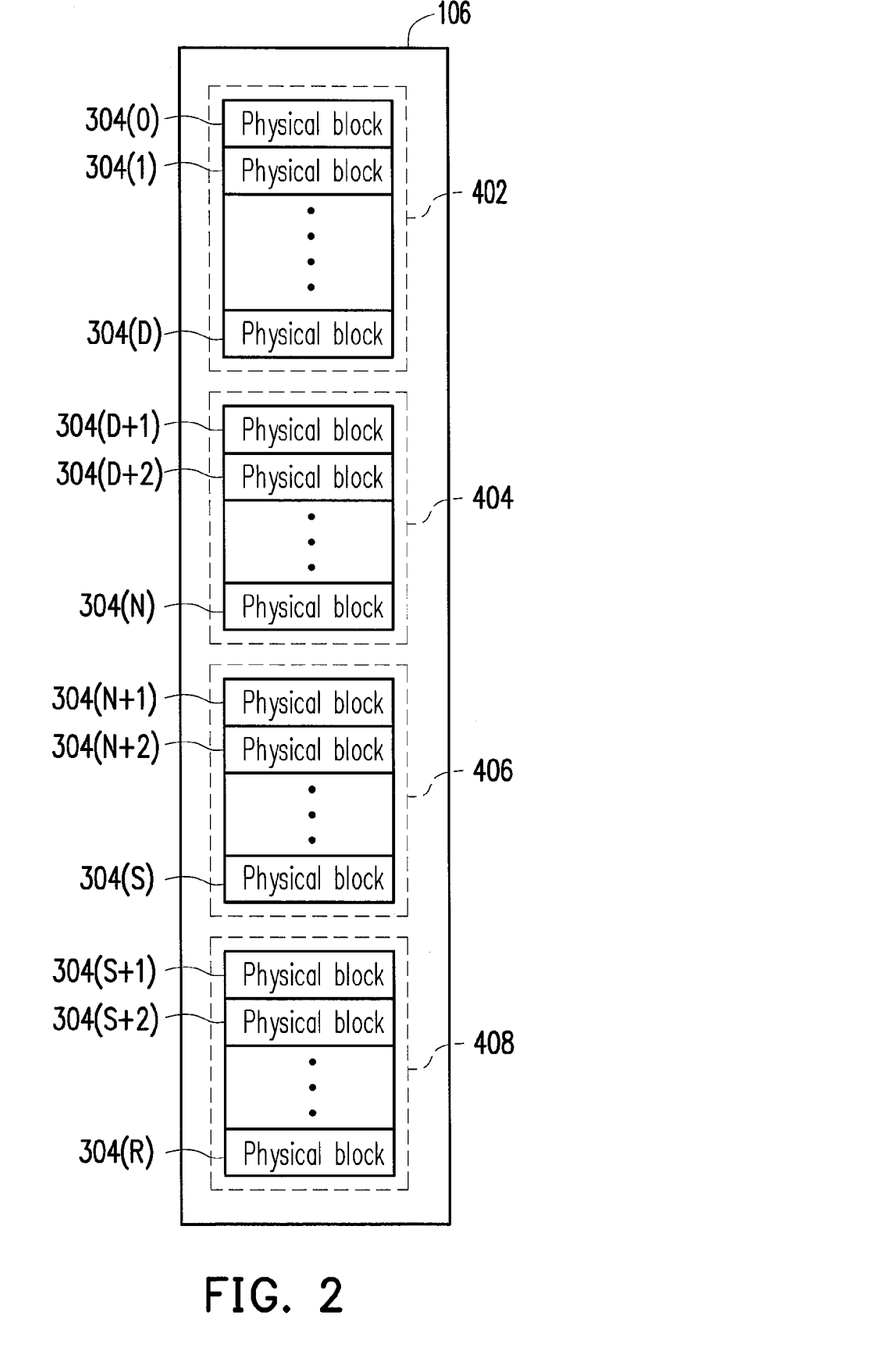
FIG. 2 and FIG. 3 are diagrams of managing physical blocks according to an exemplary embodiment.
Figure 3:
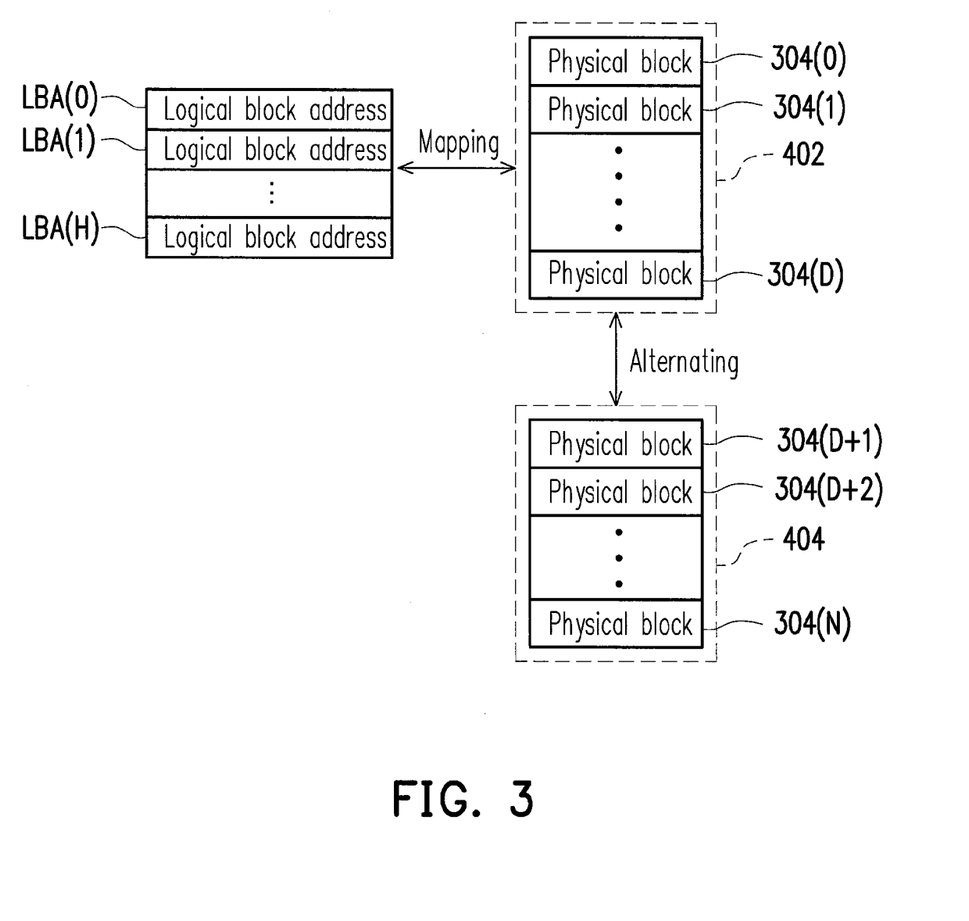

FIG. 2 and FIG. 3 are diagrams of managing physical blocks according to an exemplary embodiment.

Referring to FIG. 2, in the present exemplary embodiment, the memory controller 104 (for example, a memory management circuit) logically groups the physical blocks 304(0)-304(R) of the rewritable non-volatile memory module 106 into a data area 402, a spare area 404, a system area 406, and a replacement area 408. Physical blocks in the data area 402 and the spare area 404 are alternatively used for storing data written by the host system 1000, physical blocks in the system area 406 are used for storing system data of the memory storage apparatus 100, and physical blocks in the replacement area 408 are used for replacing bad blocks in the data area 402 and the spare area 404. For example, when the memory storage apparatus 100 is initialized, the physical blocks 304(0)-304(D) are grouped into the data area 402, the physical blocks 304(D+1)-304(N) are grouped into the spare area 404, the physical blocks 304(N+1)-304(S) are grouped into the system area 406, and the physical blocks 304(S+1)-304(R) are grouped into the replacement area 408.

Referring to FIG. 3, in order to allow the host system 1000 to conveniently access the physical blocks that are alternatively used for storing data, the memory controller 104 (for example, a memory management circuit) configures logical block addresses LBA(0)-LBA(H) for mapping to the physical blocks in the data area 402, such that the host system 1000 can directly write and read data according to the logical block addresses. The memory controller 104 (for example, a memory management circuit) uses a logical block address-physical block mapping table to record the mapping relationship between the logical block addresses LBA(0)-LBA(H) and the physical blocks in the data area 402.

In the present exemplary embodiment, initially, the memory controller 104 (for example, a memory management circuit) groups the logical block addresses LBA(0)-LBA(H) into a partition according to a file system (for example, the FAT32) and stores the file system data corresponding to the partition into the physical blocks in the data area 402.

Figure 4:
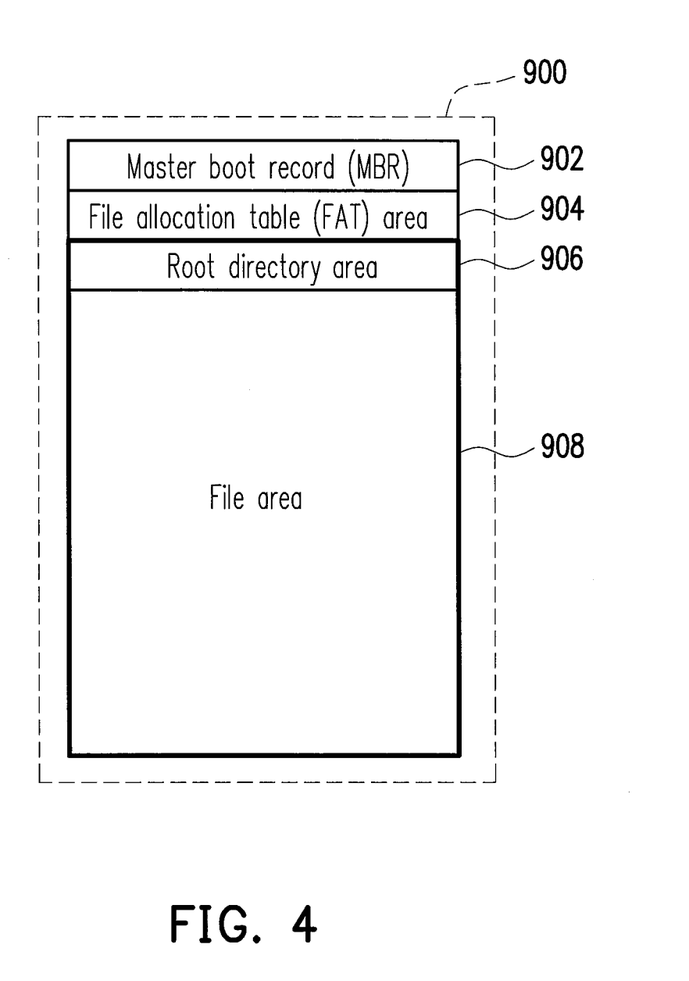
FIG. 4 illustrates an example of grouping logical block addresses by using a file system according to an exemplary embodiment.

For example, when the logical block addresses LBA(0)-LBA(H) are grouped into a partition 900 according to a file system, the partition 900 is divided into a master boot record (MBR) 902, a file allocation table (FAT) area 904, a root directory area 906, and a file area 908 (as shown in FIG. 4). Logical block addresses belonging to the MBR 902 are used for storing system information of the storage space of the memory storage apparatus 100. Logical block addresses belonging to the FAT area 904 are used for storing FATs. The FATs are used for recording entry values of logical block addresses for storing data. For example, the FAT area stores two FATs, and one of the FATs is normally accessed while the other FAT is a backup FAT. Logical block addresses belonging to the root directory area 906 are used for storing file description blocks (FDB). The FDBs are used for recording attribute information of files and directories currently stored in the memory storage apparatus 100. For example, a FDB corresponding to a file records the name of the file and the starting logical block address (i.e., starting cluster) for storing the file. A FDB corresponding to a directory records the name of the directory and the logical block addresses (i.e., clusters) of the FDBs of files or directories stored in the directory. Logical block addresses belonging to the file area 908 are grouped into a plurality of clusters and are actually used for storing file contents. When the host system 1000 accesses data in the partition 900, the OS 1110 stores data to blank addresses, reads data from addresses containing data, or deletes data according to information recorded in the MBR 902, the FAT area 904, and the root directory area 906. Generally, the MBR 902, the FAT area 904, and the root directory area 906 are placed at the beginning of the partition 900. For example, the MBR 902, the FAT area 904, and the root directory area 906 are sequentially configured by starting from a starting logical block address (for example, LBA(0)). In the present exemplary embodiment, the file system data is information recorded in the MBR 902, the FAT area 904, and the root directory area 906.

In the present exemplary embodiment, when the memory controller 104 (for example, a memory management circuit) initially groups the logical block addresses LBA(0)-LBA(H) into a partition, the memory controller 104 (for example, a memory management circuit) generates a first file system data in the logic of file system according to the size of the logical block addresses LBA(0)-LBA(H) and stores the first file system data into physical blocks (referred to as first physical blocks thereinafter) mapped to the logical block addresses at the beginning of the partition 900. Herein in the first file system data, the FAT area 904 and the root directory area 906 do not have record of any file. Namely, information carried by the first file system data is configuration information corresponding to the partition 900 storing no user data.

The memory controller 104 (for example, a memory management circuit) selects at least one physical block (referred to as a second physical block thereinafter) from the spare area 404 as a hidden area. Particularly, the memory controller 104 (for example, a memory management circuit) generates a file system data copy (referred to as a second file system data thereinafter) identical to the first file system data and stores the second file system data into the hidden area. For example, the memory controller 104 records a special mark for the second physical block such that data stored in the second physical block won't be deleted or modified.

Figure 5:
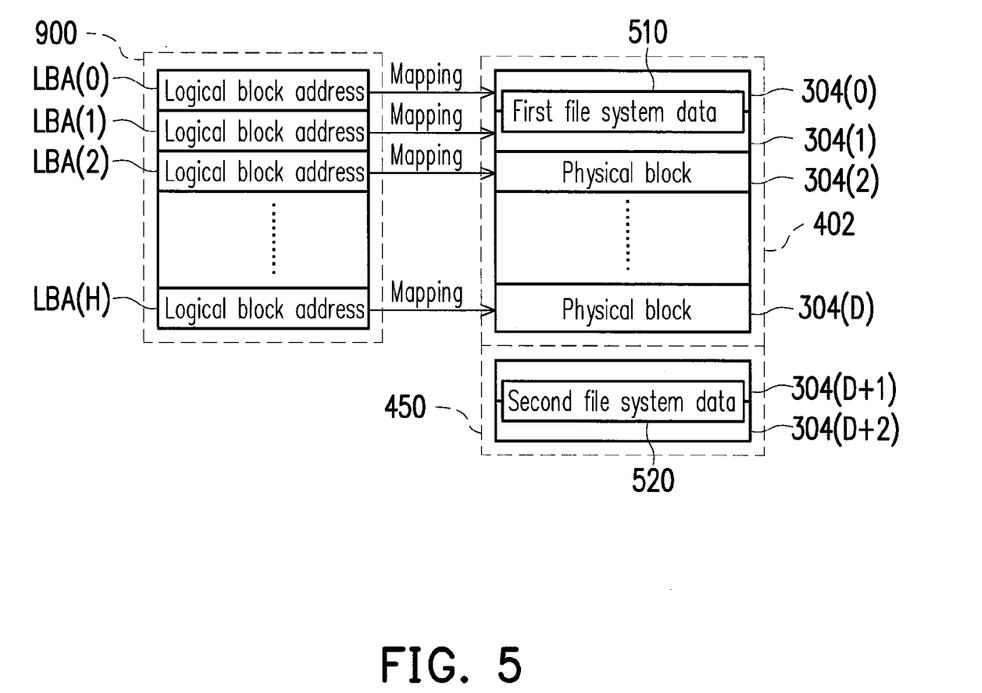
FIG. 5 is a diagram of generating file system data according to an exemplary embodiment.

FIG. 5 is a diagram generating file system data according to an exemplary embodiment.

Referring to FIG. 5, the memory controller 104 (for example, a memory management circuit) generates a first file system data 510 in the logic of file system according to the size of the logical block addresses LBA(0)-LBA(H) and stores the first file system data 510 into the physical blocks 304(0)-304(1) mapped to the logical block addresses LBA(0)-LBA(1) at the beginning of the partition 900. It should be understood that in the present exemplary embodiment, a storage space of two logical block addresses is required for storing the first file system data. However, the present invention is not limited thereto, and in another exemplary embodiment of the present invention, one or more logical block addresses may be required for storing the first file system data.

Additionally, the memory controller 104 (for example, a memory management circuit) selects the physical blocks 304(D+1)-304(D+2) from the spare area 404 as a hidden area 450, generates a second file system data 520 identical to the first file system data 510, and stores the second file system data 520 to the physical blocks 304(D+1)-304(D+2) in the hidden area 450. The memory controller 104 (for example, a memory management circuit) may generate the second file system data 520 in the logic of file system according to the size of the logical block addresses LBA(0)-LBA(H) or obtain the second file system data 520 by copying the first file system data 510.

When a user operates the host system 1000 to store data into the partition 900, the OS 1110 stores the data to the logical block addresses in the file area 908 and updates the first file system data 510, so as to record the storage state of the partition 900. In particular, if the user operates the format application program 1120 to issue a format command to the memory storage apparatus 100, the memory controller 104 (for example, a memory management circuit) adjusts the mapping relationship between the logical block addresses and the physical blocks to change the file system data accessed by the OS 1110 into the second file system data. Particularly, because the information carried by the second file system data is the configuration information corresponding to the partition 900 storing no data, the partition 900 is considered a partition which has been formatted and stores no user data.

Figure 6:
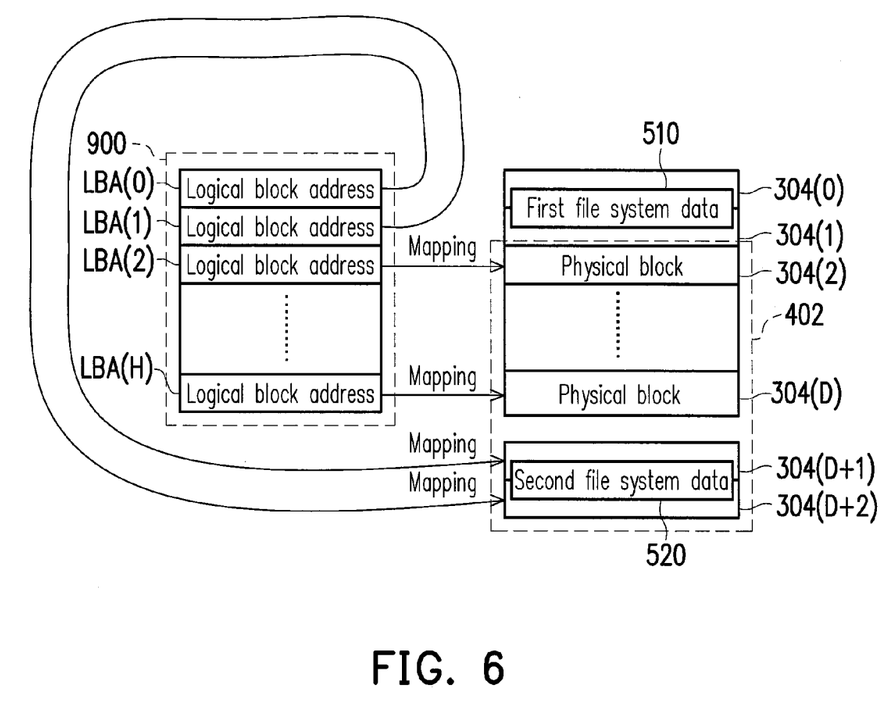
FIG. 6 is a diagram of executing a format command according to an exemplary embodiment.

FIG. 6 is a diagram of executing a format command according to an exemplary embodiment.

Referring to FIG. 6, when a format command is received from the format application program 1120 executed in the host system 1000 with the configuration illustrated in FIG. 5, the memory controller 104 (for example, a memory management circuit) re-maps the logical block address LBA(0) to the physical block 304(D+1) in the hidden area 450, re-maps the logical block address LBA(1) to the physical block 304(D+2) originally belonging to the hidden area 450, and transmits an acknowledgement message as a response to the format command. For example, the memory controller 104 (for example, a memory management circuit) changes the physical blocks mapped to the logical block addresses LBA(0)-LBA(1) to the physical blocks 304(D+1)-304(D+2) in the logical block address-physical block mapping table. Accordingly, when the OS 1110 reads the information recorded in the second file system data (i.e., the original MBR 902, FAT area 904, and root directory area 906) again, it identifies the partition 900 as a new partition storing no user data. Besides, when subsequently the user operates the host system 1000 to store data into the partition 900, the OS 1110 stores the data to the logical block addresses in the file area 908 and updates the second file system data 520.

It should be mentioned that in the example illustrated in FIG. 6, the logical block addresses LBA(0)-LBA(1) are mapped to the physical blocks 304(D+1)-304(D+2) originally in the hidden area 450 (i.e., the physical blocks 304(D+1)-304(D+2) have been associated with the data area 402). Thus, the physical blocks 304(D+1)-304(D+2) are removed from the hidden area 450, and the physical blocks 304(0)-304(1) originally mapped to the logical block addresses LBA(0)-LBA(1) are associated with the spare area 404. For example, the memory controller 104 (for example, a memory management circuit) executes an erasing operation on the physical blocks 304(0)-304(1).

Particularly, in another exemplary embodiment of the present invention, after associating the physical blocks storing the second file system data 520 in the hidden area 450 with the data area 402, the memory controller 104 (for example, a memory management circuit) selects at least one physical block (referred to as third physical blocks thereinafter) from the spare area 404 as physical blocks in the hidden area 450, generates a third file system data in the logic of file system according to the size of the logical block addresses LBA(0)-LBA(H), and stores the third file system data into the hidden area 450. Information carried by the third file system data is configuration information corresponding to the partition 900 storing no user data.

Figure 7:
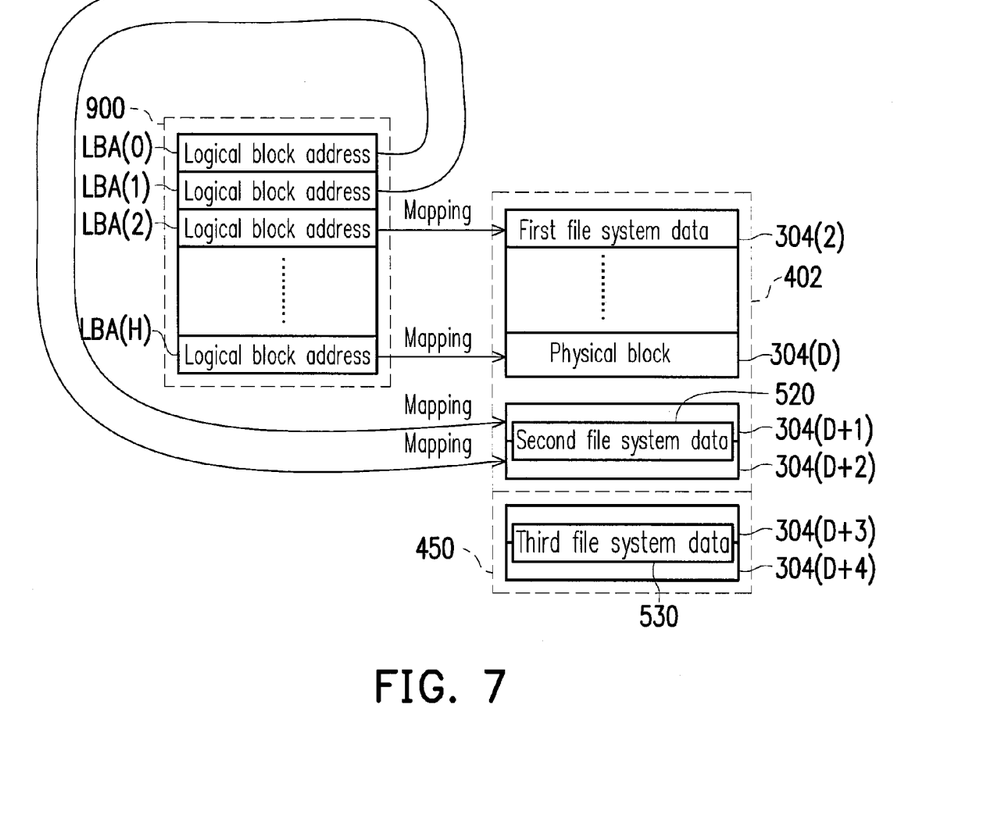
FIG. 7 is a diagram of re-generating file system data according to another exemplary embodiment.

FIG. 7 is a diagram of re-generating file system data according to another exemplary embodiment.

Referring to FIG. 7, the memory controller 104 (for example, a memory management circuit) selects the physical blocks 304(D+3)-304(D+4) from the spare area 404 and associates the physical blocks 304(D+3)-304(D+4) with the hidden area 450. In addition, the memory controller 104 (for example, a memory management circuit) generates a third file system data 530 and stores the third file system data 530 into the physical blocks 304(D+3)-304(D+4) in the hidden area 450. The memory controller 104 (for example, a memory management circuit) may generate the third file system data 530 with the logic of file system according to the size of the logical block addresses LBA(0)-LBA(H) or obtains the third file system data 530 by copying the second file system data 520 before the second file system data 520 is updated. Subsequently, when another format command is received from the format application program 1120 executed in the host system 1000, the memory controller 104 (for example, a memory management circuit) re-maps the logical block addresses LBA(0)-LBA(1) to the physical blocks storing file system data in the hidden area 450, so as to instantly respond to the format command issued by the format application program 1120.

It should be mentioned that the memory controller 104 (for example, a memory management circuit) executes the operations illustrated in FIG. 7 when the memory storage apparatus 1000 is in an idle state or receives a request from the format application program 1120.

Because the time required for adjusting the mapping target of the logical block addresses LBA(0)-LBA(1) is very short compared to actually formatting the logical block addresses LBA(0)-LBA(1), the memory storage apparatus and the memory controller provided by exemplary embodiments of the invention can effectively shorten the time for responding a format command.

It should be mentioned that in the present exemplary embodiment, when the host system 1000 executes a format command, the memory controller 104 selects empty physical blocks (i.e., aforementioned third physical blocks) from the spare area 404 as physical blocks in the hidden area 450 for storing newly generated file system data. However, in another exemplary embodiment of the present invention, the memory controller 104 may also use fixed physical blocks (for example, aforementioned first physical blocks and second physical blocks) alternatively for storing new file system data. For example, when the memory storage apparatus 100 is initialized, the physical blocks 304(0)-304(1) store the first file system data and are mapped to the logical block addresses LBA(0)-LBA(1). Besides, the physical blocks 304(D+1)-304(D+2) store the second file system data. Subsequently, when the host system 1000 executes a format command, the logical block addresses LBA(0)-LBA(1) are re-mapped to the physical blocks 304(D+1)-304(D+2), and the physical blocks 304(0)-304(1) are erased to be used for storing the third file system data.

Figure 8:
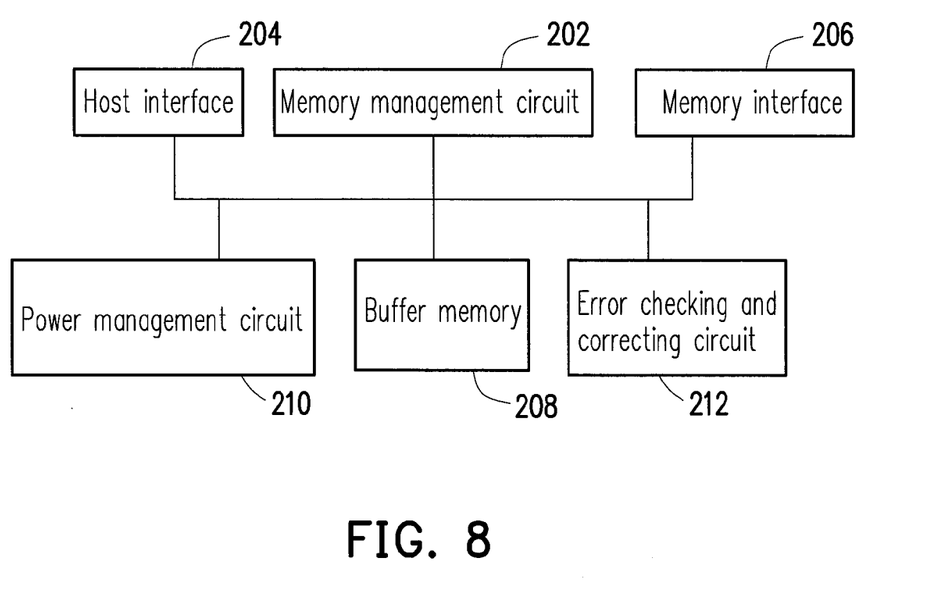
FIG. 8 is a schematic block diagram of a memory controller according to an exemplary embodiment.

FIG. 8 is a schematic block diagram of a memory controller according to an exemplary embodiment. It should be understood that the memory controller illustrated in FIG. 8 is only an example but not intended to limit the invention.

Referring to FIG. 8, the memory controller 104 includes a memory management circuit 202, a host interface 204, a memory interface 206, a buffer memory 208, a power management circuit 210, and an error checking and correcting (ECC) circuit 212.

The memory management circuit 202 controls the overall operation of the memory controller 104. To be specific, the memory management circuit 202 has a plurality of control instructions, and when the memory storage apparatus 100 is powered on, the control instructions are executed to control the overall operation of the memory controller 104. For example, the memory management circuit 202 executes the formatting mechanism in the present exemplary embodiment to respond to a format command issued by the format application program 1120.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit In another exemplary embodiment of the present invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has boot codes. When the memory controller 104 is enabled, the microprocessor unit first executes the boot codes to load the control instructions from the rewritable non-volatile memory module 106 into the RAM of the memory management circuit 202. Thereafter, the microprocessor unit runs the control instructions.

Moreover, in yet another exemplary embodiment of the present invention, the control instructions of the memory management circuit 202 may also be implemented in a hardware form. For example, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical blocks of the rewritable non-volatile memory module 106. The memory writing circuit is configured to issue a write command to the rewritable non-volatile memory module 106 to store data into the rewritable non-volatile memory module 106. The memory reading circuit is configured to issue a read command to the rewritable non-volatile memory module 106 to read data from the rewritable non-volatile memory module 106. The memory erasing circuit is configured to issue an erase command to the rewritable non-volatile memory module 106 to erase data from the rewritable non-volatile memory module 106. The data processing circuit is configured to process data to be stored into and read from the rewritable non-volatile memory module 106.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the USB standard. However, the invention is not limited thereto, and the host interface 204 may also comply with the MS standard, the MMC standard, the CF standard, the PATA standard, the IEEE 1394 standard, the PCI express standard, the SATA standard, the SD standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The buffer memory 208 is coupled to the memory management circuit 202 and configured to temporarily store data and commands from the host system 1000 or data from the rewritable non-volatile memory module 106.

The power management circuit 210 is coupled to the memory management circuit 202 and configured to control the power supply of the memory storage apparatus 100.

The ECC circuit 212 is coupled to the memory management circuit 202 and configured to execute an ECC procedure to ensure data accuracy. To be specific, when the memory management circuit 202 receives a write command from the host system 1000, the ECC circuit 212 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 212 executes the ECC procedure on the data according to the ECC code.

Figure 9A:
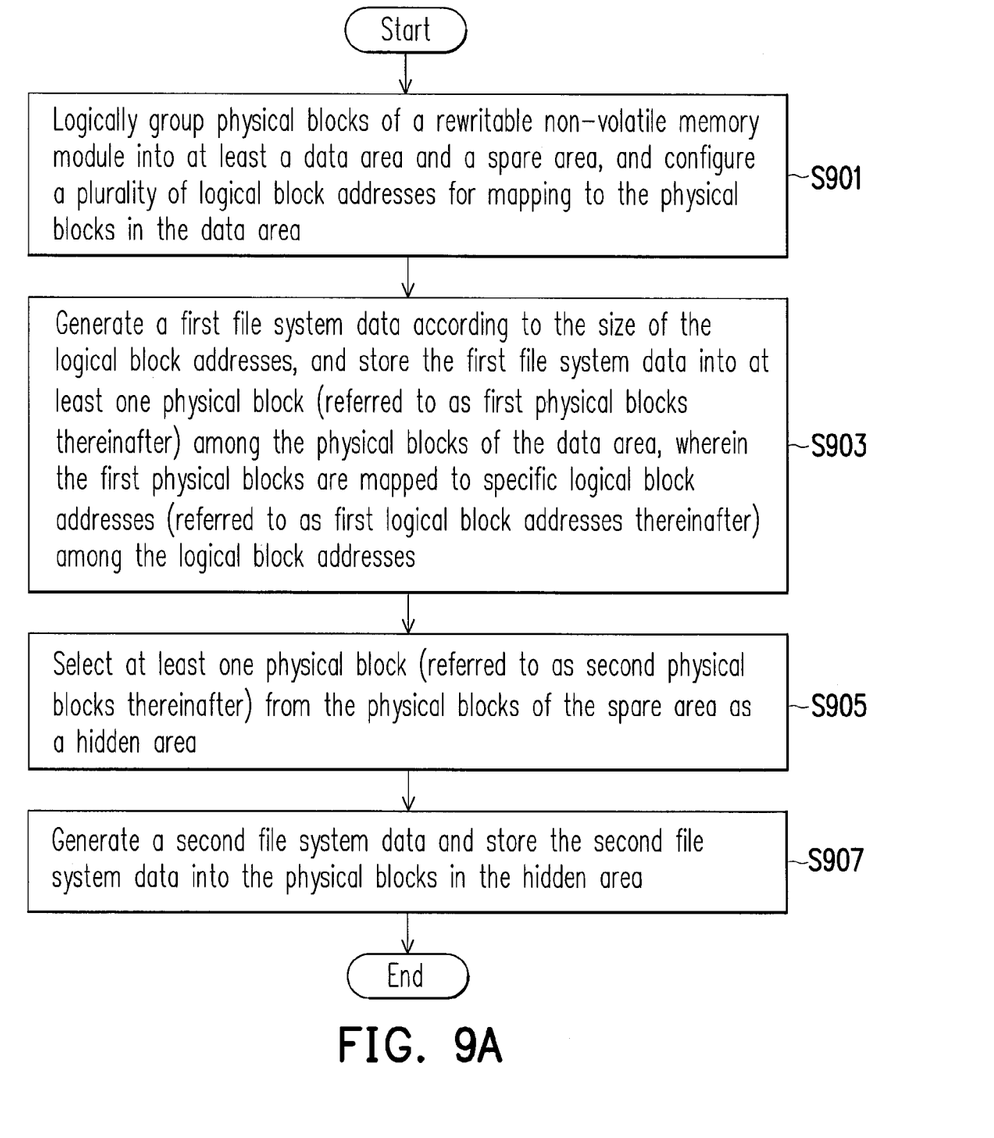
FIG. 9A and FIG. 9B are flowcharts of a memory formatting method according to an exemplary embodiment.
Figure 9B:
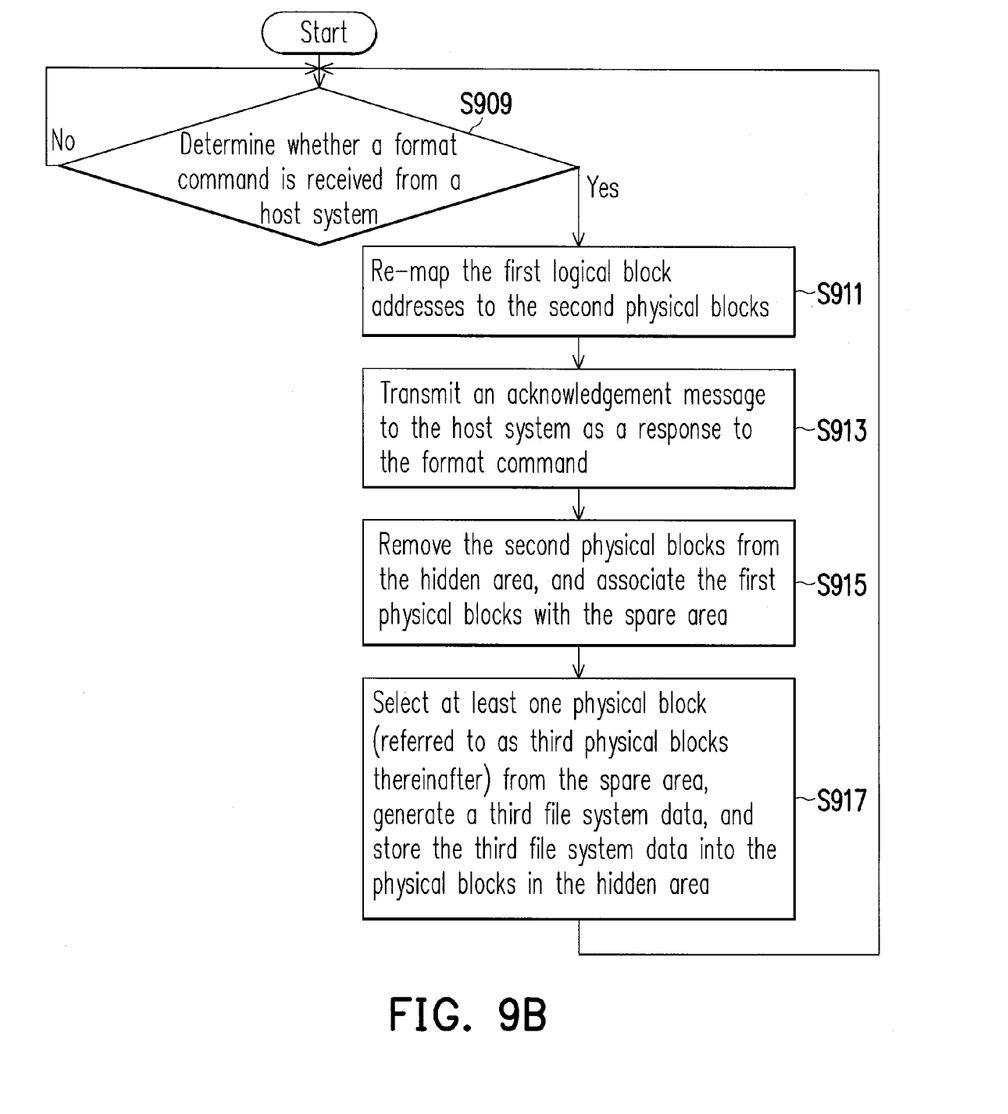

FIG. 9A and FIG. 9B are flowcharts of a memory formatting method according to an exemplary embodiment. It should be understood that the steps illustrated in FIG. 9A and FIG. 9B are only an example but not intended to limit the present invention.

FIG. 9A illustrates the steps for initially generating file system data. Referring to FIG. 9A, in step S901, physical blocks 304(0)-304(R) of the rewritable non-volatile memory module 106 are logically grouped into at least a data area and a spare area, and a plurality of logical block addresses is configured to be mapped to the physical blocks in the data area. The method for logically grouping the physical blocks and configuring the logical block addresses to be mapped to the physical blocks in the data area has been described above in detail with reference to FIG. 2 and FIG. 3 therefore will not be described herein.

In step S903, a first file system data 510 is generated according to the size of the logical block addresses and is stored into at least one physical block (referred to as first physical blocks thereinafter) among the physical blocks in the data area, wherein the first physical blocks are mapped to specific logical block addresses (referred to as first logical block addresses thereinafter) among the logical block addresses. For example, in an exemplary embodiment, the logical block addresses are arranged into a partition, and the first logical block addresses are at least one logical block address continuously arranged by starting from a starting address of the partition.

Next, in step S905, at least one physical block (referred to as second physical blocks thereinafter) is selected among the physical blocks in the spare area and served as a hidden area 450. In step S907, a second file system data 520 is generated and stored into the physical blocks (i.e., the second physical blocks) in the hidden area. As described above, the second file system data 520 can be generated in the logic of file system according to the size of the logical block addresses LBA(0)-LBA(H) or obtained by copying the first file system data 510.

FIG. 9B illustrates the steps executed when a format command is received. For example, the procedure illustrated in FIG. 9B is terminated when the memory storage apparatus 100 is shut down.

Referring to FIG. 9B, in step S909, whether a format command is received from a host system 1000 is determined. In the present exemplary embodiment, the format command may be transmitted by a format application program 1120 executed in the host system 1000 through a vendor command.

If no format command is received from the host system 1000, step S909 is executed.

If a format command is received from the host system 1000, in step S911, the first logical block addresses are re-mapped to the second physical blocks.

In step S913, an acknowledgement message is transmitted to the host system 1000 as a response to the format command.

Thereafter, in step S915, the second physical blocks are removed from the hidden area 450, and the first physical blocks are associated with the spare area 404.

Next, in step S917, at least one physical block (referred to as third physical blocks thereinafter) are selected from the spare area 404, and a third file system data 530 is generated and stored into the physical blocks (i.e., the third physical blocks) in the hidden area 450. After that, step S909 is executed. As described above, the third file system data 530 can be generated with the logic of file system according to the size of the logical block addresses LBA(0)-LBA(H) or obtained by copying the unmodified second file system data 520.

As described above, a memory storage apparatus, a memory controller, and a memory formatting method thereof provided by exemplary embodiments of the invention can execute a format command quickly and effectively shorten the time required for responding to a host system. The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory formatting method for a memory storage apparatus, wherein the memory storage apparatus has a rewritable non-volatile memory module, and the rewritable non-volatile memory module has a plurality of physical blocks, the memory formatting method comprising:
configuring a plurality of logical block addresses for mapping to a portion of the physical blocks;
generating a first file system data and a second file system data according to a size of the logical block addresses at initial partition of the logical block addresses;
storing the first file system data into at least one first physical block among the physical blocks, wherein the at least one first physical block is mapped to at least one first logical block address among the logical block addresses, wherein the first file system data is updated if data is written to the logical block addresses;
selecting at least one second physical block among the physical blocks;
storing the second file system data into the at least one second physical block;
determining whether a format command is received from a host system; and
when the format command is received from the host system, re-mapping the at least one first logical block address to the at least one second physical block,
wherein before the step of re-mapping the at least one first logical block address to the at least one second physical block, the second file system data is not updated if data is written to the logical block addresses, and
wherein after the step of remapping the at least one first logical block address to the at least one second physical block, the second file system data is updated if data is written to the logical block addresses.

2. The memory formatting method according to claim 1 further comprising:
logically grouping the physical blocks into at least a data area and a spare area,
wherein the step of storing the first file system data into the at least one first physical block among the physical blocks comprises: selecting at least one physical block from the physical blocks of the data area as the at least one first physical block and storing the first file system data into the at least one first physical block,
wherein the step of selecting the at least one second physical block among the physical blocks comprises: selecting at least one physical block from the physical blocks of the spare area as the at least one second physical block and serving the at least one second physical block as a hidden area.

3. The memory formatting method according to claim 2 further comprising:
after re-mapping the at least one first logical block address to the at least one second physical block, removing the at least one second physical block from the hidden area, associating the at least one second physical block with the data area, and associating the at least one first physical block with the spare area.

4. The memory formatting method according to claim 1 further comprising:
executing a format application program in the host system; and
transmitting the format command to the memory storage apparatus by using the format application program through a vendor command.

5. The memory formatting method according to claim 1, wherein the logical block addresses belong to a partition, and the at least one first logical block address is at least one logical block address continuously arranged from a starting address of the partition.

6. The memory formatting method according to claim 3 further comprising:
after re-mapping the at least one first logical block address to the at least one second physical block, generating a third file system data according to the size of the logical block addresses, selecting at least one third physical block from the physical blocks of the spare area, associating the at least one third physical block with the hidden area, and storing the third file system data into the at least one third physical block.

7. The memory formatting method according to claim 1 further comprising:
after re-mapping the at least one first logical block address to the at least one second physical block, generating a third file system data according to the size of the logical block addresses, erasing the at least one first physical block, and storing the third file system data into the at least one first physical block.

8. A memory controller for controlling a rewritable non-volatile memory module of a memory storage apparatus, wherein the rewritable non-volatile memory module has a plurality of physical blocks, the memory controller comprising:
a host interface, configured to couple to a host system;
a memory interface, configured to couple to the rewritable non-volatile memory module; and
a memory management circuit, coupled to the host interface and the memory interface, wherein the memory management circuit is configured to configure a plurality of logical block addresses for mapping to a portion of the physical blocks,
wherein the memory management circuit is further configured to generate a first file system data and a second file system data according to a size of the logical block addresses at initial partition of the logical block addresses and store the first file system data into at least one first physical block among the physical blocks, wherein the at least one first physical block is mapped to at least one first logical block address among the logical block addresses, and wherein the first file system data is updated if data is written to the logical block addresses,
wherein the memory management circuit is further configured to select at least one second physical block among the physical blocks and store the second file system data into the at least one second physical block,
wherein the memory management circuit is further configured to determine whether a format command is received from the host system, and when the format command is received from the host system, the memory management circuit is further configured to re-map the at least one first logical block address to the at least one second physical block, wherein before the at least one first logical block address is re-mapped to the at least one second physical block, the second file system data is not updated if data is written to the logical block addresses, and wherein after the at least one first logical block address is re-mapped to the at least one second physical block, the second file system data is updated if data is written to the logical block addresses.

9. The memory controller according to claim 8, wherein the memory management circuit is further configured to logically group the physical blocks into at least a data area and a spare area, select at least one physical block from the physical blocks in the data area as the at least one first physical block, select at least one physical block from the physical blocks of the spare area as the at least one second physical block, and serve the at least one second physical block as a hidden area.

10. The memory controller according to claim 9, wherein after re-mapping the at least one first logical block address to the at least one second physical block, the memory management circuit is further configured to remove the at least one second physical block from the hidden area, associate the at least one second physical block with the data area, and associate the at least one first physical block with the spare area.

11. The memory controller according to claim 8, wherein the format command is transmitted by a format application program executed in the host system to the memory storage apparatus through a vendor command.

12. The memory controller according to claim 8, wherein the logical block addresses belong to a partition, and the at least one first logical block address is at least one logical block address continuously arranged from a starting address of the partition.

13. The memory controller according to claim 10, wherein after re-mapping the at least one first logical block address to the at least one second physical block, the memory management circuit is further configured to generate a third file system data according to the size of the logical block addresses, select at least one third physical block from the physical blocks of the spare area, associate the at least one third physical block with the hidden area, and store the third file system data into the at least one third physical block.

14. The memory controller according to claim 8, wherein after re-mapping the at least one first logical block address to the at least one second physical block, the memory management circuit is further configured to generate a third file system data according to the size of the logical block addresses, erase the at least one first physical block, and store the third file system data into the at least one first physical block.

15. A memory storage apparatus, comprising:
a connector, configured to couple to a host system;
a rewritable non-volatile memory module, having a plurality of physical blocks; and
a memory controller, coupled to the connector and the rewritable non-volatile memory module,
wherein the memory controller is configured to configure a plurality of logical block addresses for mapping to a portion of the physical blocks,
wherein the memory controller is further configured to generate a first file system data and a second file system data according to a size of the logical block addresses at initial partition of the logical block addresses and store the first file system data into at least one first physical block among the physical blocks, wherein the at least one first physical block is mapped to at least one first logical block address among the logical block addresses, and wherein the first file system data is updated when data is written to the logical block addresses,
wherein the memory controller is further configured to select at least one second physical block among the physical blocks and store the second file system data into the at least one second physical block,
wherein the memory controller is further configured to determine whether a format command is received from the host system, and when the format command is received from the host system, the memory controller is further configured to re-map the at least one first logical block address to the at least one second physical block, wherein before the at least one first logical block address is re-mapped to the at least one second physical block, the second file system data is not updated when data is written to the logical block addresses, and wherein after the at least one first logical block address is re-mapped to the at least one second physical block, the second file system data is updated when data is written to the logical block addresses.

16. The memory storage apparatus according to claim 15, wherein the memory controller is further configured to logically group the physical blocks into at least a data area and a spare area, select at least one physical block from the physical blocks of the data area as the at least one first physical block, select at least one physical block from the physical blocks of the spare area as the at least one second physical block, and serve the at least one second physical block as a hidden area.

17. The memory storage apparatus according to claim 16, wherein after re-mapping the at least one first logical block address to the at least one second physical block, the memory controller is further configured to remove the at least one second physical block from the hidden area, associate the at least one second physical block with the data area, and associate the at least one first physical block with the spare area.

18. The memory storage apparatus according to claim 15, wherein the format command is transmitted by a format application program executed in the host system through a vendor command.

19. The memory storage apparatus according to claim 15, wherein the logical block addresses belong to a partition, and the at least one first logical block address is at least one logical block addresses continuously arranged from a starting address of the partition.

20. The memory storage apparatus according to claim 17, wherein after re-mapping the at least one first logical block address to the at least one second physical block, the memory controller is further configured to generate a third file system data according to the size of the logical block addresses, select at least one third physical block from the physical blocks of the spare area, associate the at least one third physical block with the hidden area, and store the third file system data into the at least one third physical block.

21. The memory storage apparatus according to claim 15, wherein after re-mapping the at least one first logical block address to the at least one second physical block, the memory controller is further configured to generate a third file system data according to the size of the logical block addresses, erase the at least one first physical block, and store the third file system data into the at least one first physical block.

* * * * *